US012778037B2

(12) United States Patent
Shoham et al.

(10) Patent No.: US 12,778,037 B2
(45) Date of Patent: Nov. 3, 2026

(54) METHOD AND SYSTEM FOR GATHERING AND DRAINING FLOATING BIOMASS

(71) Applicant: GreenOnyx LTD, Tel Aviv (IL)

(72) Inventors: Benjamin Shoham, Gany-Tikvah (IL); Guy Steinberg, Maor (IL)

(73) Assignee: GreenOnyx LTD, Tel Aviv (IL)

( * ) Notice: Subject to any disclaimer, the term of this patent is extended or adjusted under 35 U.S.C. 154(b) by 0 days.

(21) Appl. No.: 19/048,256

(22) Filed: Feb. 7, 2025

(65) Prior Publication Data

US 2026/0231885 A1 Aug. 13, 2026

(51) Int. Cl.
*A01G 33/00* (2006.01)

(52) U.S. Cl.
CPC .................................... *A01G 33/00* (2013.01)

(58) Field of Classification Search
CPC ..... A01G 33/00; A01G 31/024; A01G 27/008
See application file for complete search history.

(56) References Cited

U.S. PATENT DOCUMENTS

| | | | | |
|---|---|---|---|---|
| 2010/0325948 | A1* | 12/2010 | Parsheh | A01G 33/00 47/1.4 |
| 2012/0117869 | A1* | 5/2012 | Javan | A01G 33/00 47/60 |
| 2015/0234394 | A1 | 8/2015 | Shoham et al. | |
| 2015/0250113 | A1* | 9/2015 | Shoham | C12M 23/18 47/62 R |
| 2017/0052165 | A1* | 2/2017 | Zapata Penasco | C12M 29/10 |
| 2025/0024800 | A1* | 1/2025 | Lam | A01G 31/06 |

FOREIGN PATENT DOCUMENTS

ES 2382221 T3 6/2012

OTHER PUBLICATIONS

International Search Report and Written Opinion of the International Searching Authority directed to International Patent Application No. PCT/IB2025/063500, mailed Apr. 22, 2026; 8 pages.

* cited by examiner

*Primary Examiner* — Michael H Wang
(74) *Attorney, Agent, or Firm* — Sterne, Kessler, Goldstein & Fox P.L.L.C.

(57) ABSTRACT

Methods for gathering and draining floating biomass comprising providing a tray for holding said biomass and fluid, where said tray comprises: (a) at least one drain orifice for draining at least a part of said floating biomass and at least a part of a top layer of said fluid; and (b) at least one inlet orifice for flowing said fluid into said tray for maintaining a surface flow height, for maintaining a surface fall operation of a fluid level in said tray while continuing said draining of a part of said floating biomass and of a part of said biomass through said at least one drain in said surface fall operation.

15 Claims, 3 Drawing Sheets

METHOD AND SYSTEM FOR GATHERING AND DRAINING FLOATING BIOMASS

TECHNICAL FIELD

The present disclosure generally relates to floating biomass. More particularly, embodiments relate to the gathering and draining of floating biomass, and to the handling and controlling the movement of floating biomass.

BACKGROUND

Aquatic edible plants are attractive vegetables because they are convenient, tasty, and an excellent source of protein, dietary fibers, essential minerals (dietary chemical elements), key vitamins, and other phytochemicals (e.g. antioxidants) needed for a healthy diet. Thus, cultivating aquatic plants and the distribution of these aquatic plants to consumers are fields of interest.

Lemnaceae is a family of aquatic plants, also known as the duckweed family. Duckweeds are fast-growing and high-pigment-containing monocotyledonous plants and are classified as macrophytes. The duckweeds have a simple structure, lacking an obvious stem or leaves, where the greater part of each plant is a few cells thick, with air pockets (aerenchyma) that allow it to float on the water surface. Thus, a need arises to efficiently cultivate and distribute these floating aquatic plants.

US2012117869 discloses an apparatus for culturing aquatic species comprising: a container configured to contain the aquatic species in sufficient culture medium to permit normal growth of the aquatic species, wherein the container has a configuration allowing the culture medium to flow in a continuous loop; a propulsion mechanism configured to apply sufficient force to the culture medium to cause motion thereof; and an automated harvest system configured to permit harvest of the aquatic species without ceasing the motion. Nevertheless, the disclosed apparatus is cumbersome and requires complex automation.

Accordingly, a continuing need exists for improvements in cultivating, and gathering floating biomass, such as floating aquatic plants. In particular, new methods and systems for gathering and draining floating biomass without cumbersome mechanical mechanisms are desirable.

SUMMARY

It is an object of the present disclosure to provide a system and method for gathering and draining floating biomass easily and efficiently.

It is another object of the present disclosure to provide an efficient and reliable method for gathering floating plants, from a receptacle, without damaging the plants.

It is still another object of the present disclosure to provide an efficient and reliable method for controlling, gathering, draining, harvesting and manipulating biomass floating on a growing substrate fluid.

It is still another object of the present disclosure to provide a system for gathering and controlling floating biomass by manipulating fluid dynamics without the need for any mechanical elements to come into direct contact with the biomass, especially in a sealed sterile cultivation environment.

Other objects and advantages of embodiments according to the present disclosure will become apparent as the description proceeds.

The present disclosure relates to a method for gathering and draining floating biomass comprising: providing a tray for holding said floating biomass and fluid, wherein said tray has at least one inlet orifice and at least one drain orifice; leveling a surface layer containing said floating biomass within said tray to a surface flow height such that a surface fall operation is triggered; draining a part of said surface layer of said fluid and at least a part of said floating biomass through said at least one drain orifice in said surface fall operation wherein said surface layer and said floating biomass start to fall in a cascading manner; flowing said fluid into said tray through said at least one inlet orifice of said tray; and continuing said draining of said part of said surface layer of said fluid and of said at least said part of said floating biomass through said at least one drain orifice in said surface fall operation to maintain said surface flow height of said surface layer in said tray, thereby maintaining said surface fall operation in said tray.

Preferably the method further comprises: continuing to flow said fluid through said at least one inlet orifice, to maintain said surface flow height of a fluid level in said tray; and controlling a volume flow rate of said fluid flowed into said tray to match a volume flow rate of said fluid and said floating biomass drained from said tray through said at least one drain orifice.

Preferably, said floating biomass is gathered and drained until a preset portion of said floating biomass within said tray is left in said tray.

In some embodiments, said preset portion is greater than 0% and less than or equal to 0.01% of said floating biomass collected.

Preferably, said floating biomass is a floating aquatic plant culture.

Preferably the method further comprises at least one measurement action to match a volume flow rate of said fluid into said tray through said at least one inlet orifice of said tray with a draining volume flow rate through said at least one drain orifice of said tray, to maintain said surface flow height of a fluid level in said tray and said surface fall operation, wherein said surface layer and said floating biomass fall in said cascading manner.

The present disclosure further relates to a system for gathering and draining floating biomass comprising: a tray for holding said floating biomass and a fluid comprising: at least one drain orifice configured to drain at least a part of said floating biomass and at least a part of a top layer of said fluid; and at least one inlet orifice configured to flow said fluid into said tray to maintain a surface flow height, to maintain a surface fall operation of a fluid level in said tray while continuing to drain a part of said floating biomass and a part of said floating biomass through said at least one drain orifice in said surface fall operation.

In some embodiments, the system further comprises a pump connected to said at least one inlet orifice for flowing fluid into said tray.

In some embodiments, the system further comprises a pump connected to said at least one drain orifice for draining said at least said part of said floating biomass and said at least said part of said top layer of said fluid.

In some embodiments, the system further comprises a controller configured to control said pump connected to said at least one inlet orifice for controlling a flow of fluid into said tray.

In some embodiments, the system further comprises a controller configured to control said pump connected to said at least one drain orifice for controlling a flow of fluid from said tray.

In some embodiments, said at least one drain orifice and said at least one inlet orifice each comprise a closing mechanism to control a flow through said at least one drain orifice and said at least one inlet orifice.

In some embodiments, said at least one drain orifice and said at least one inlet orifice each comprise at least one connected conduit.

In some embodiments, said at least one connected conduit comprises at least one valve to control a flow through said at least one drain orifice and said at least one inlet orifice.

In some embodiments, the system further comprises a controller configured to control said at least one valve on said at least one connected conduit to control said flow of said fluid into said tray.

BRIEF DESCRIPTION OF THE DRAWINGS

The accompanying drawings, and specific references to their details, are herein used, by way of example only, to illustratively describe some of the embodiments of the disclosure.

DETAILED DESCRIPTION

Figure 1:
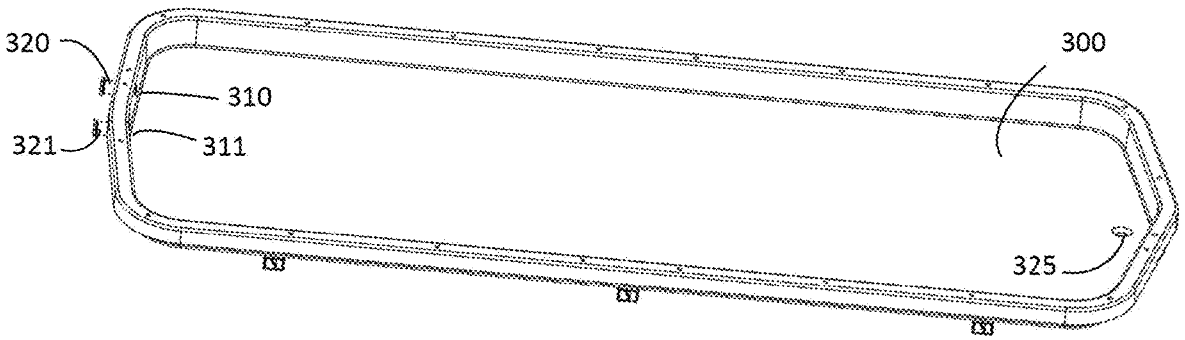
FIG. 1 is a diagram of an exemplary tray for growing biomass, from a perspective view, according to some embodiments.

In nature, floating biomass like duckweeds-small biomass units consisting of hundreds of cells with air pockets-often forms extensive "carpets", i.e. layers, on the surface of rivers and ponds. Despite their aggregation, duckweeds remain as separate units rather than merging into a single block. This characteristic makes gathering them from one receptacle to another, with minimal residue, a challenging task. Methods and systems according to embodiments of the present disclosure utilize devices and flow techniques to efficiently gather and drain these individual biomass units.

The indefinite articles "a," "an," and "the" include plural referents unless clearly contradicted or the context clearly dictates otherwise.

As used herein, the term "about" refers to a value that is within +10% of the value stated. For example, about 3 degrees can include any number from 2.7 degrees to 3.3 degrees.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

As used herein "biomass" may refer to a culture of floating aquatic plants, such as a plant from the Lemnaceae family (duckweed), such as *Spirodela* plants, *Landoltia* plants, *Lemna* plants, *Wolffiella* plants, or *Wolffia* plants.

The term "tray" may refer to a receptacle, pool, or container, capable of holding biomass and fluids. The tray may have different shapes suitable for the process, such as a flat elongated hexagonal shape with rounded corners and raised edges, as depicted for example in FIG. 1.

The terms "fluid" or "fluids" may refer to filtered water, deionized water, mineral water with or without culture medium, or any other fluid used in relations with handling biomass.

The term "laminar flow" may refer to the property of fluid particles in fluid dynamics that follow smooth paths in horizontal layers, with each horizontal layer moving smoothly past the adjacent layers with little or no mixing. At low velocities, the fluid tends to flow without lateral mixing, and adjacent horizontal layers slide past one another smoothly with no cross-currents perpendicular to the direction of flow, nor eddies, nor swirls of fluids. In laminar flow, the motion of the particles of the fluid is very orderly with particles close to a solid surface moving in parallel layers to the surface. Laminar flow occurs at lower velocities, below a threshold at which the flow becomes turbulent. The laminar flow phenomena ensures that both the fluid and the floating biomass flow in consistent layers, maintaining a smooth, turbulence-free flow. When the layers of the fluid move in a laminar flow order, the top layer in the laminar flow, i.e. the surface flow containing the floating biomass, moves at the highest velocity, in relation to the other layers, while the lower layers move at gradually decreasing speed where each layer is slower than its adjacent layer above.

The term "surface fall operation" may comprise the following three key processes, which are triggered simultaneously upon reaching the surface flow height:

1. Laminar flow movement: Ensures that both the fluid and floating biomass are transferred in consistent layers, maintaining a smooth, turbulence-free flow.

2. Surface flow and biomass gathering: the top surface layer—containing the floating biomass—is moving in a laminar flow fashion at the highest speed, while the fluid laminar layers beneath gradually decrease in speed towards the tray's bottom, thus gathering the biomass towards the drain orifice.

3. Cascading fall and biomass draining: The floating biomass floats on the top surface layer, in a laminar flow fashion, at the highest speed to the drain orifice, and falls in a cascading manner into the drain, enabling efficient gathering and draining of the floating biomass.

Figure 3:
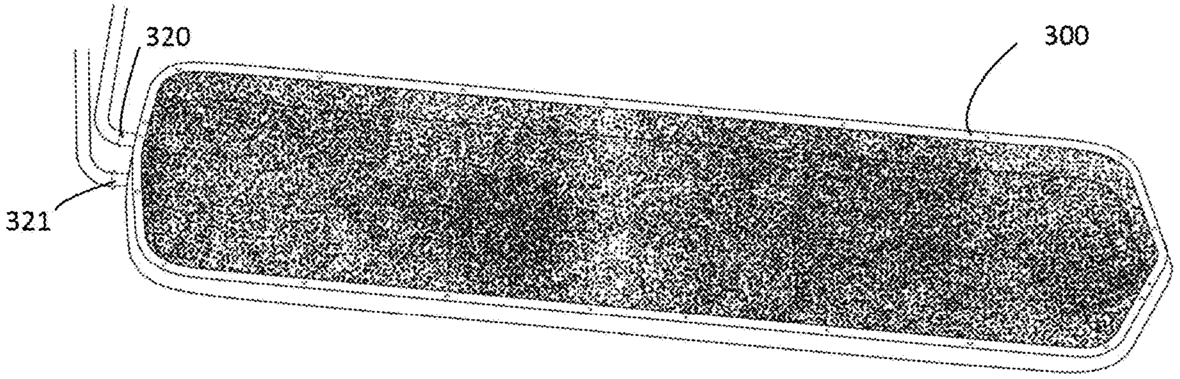
FIG. 3 is a diagram of biomass floating over fluids in the exemplary tray, from a perspective view, according to some embodiments.
Figure 4:
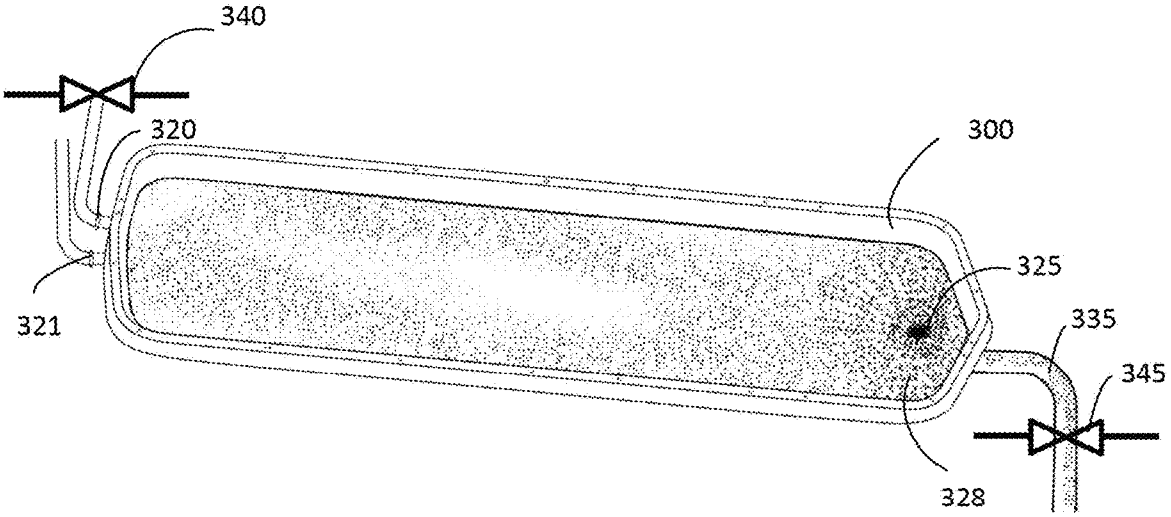
FIG. 4 is a diagram of a tray with biomass floating and draining from the tray, from a perspective view, according to some embodiments.
Figure 6:
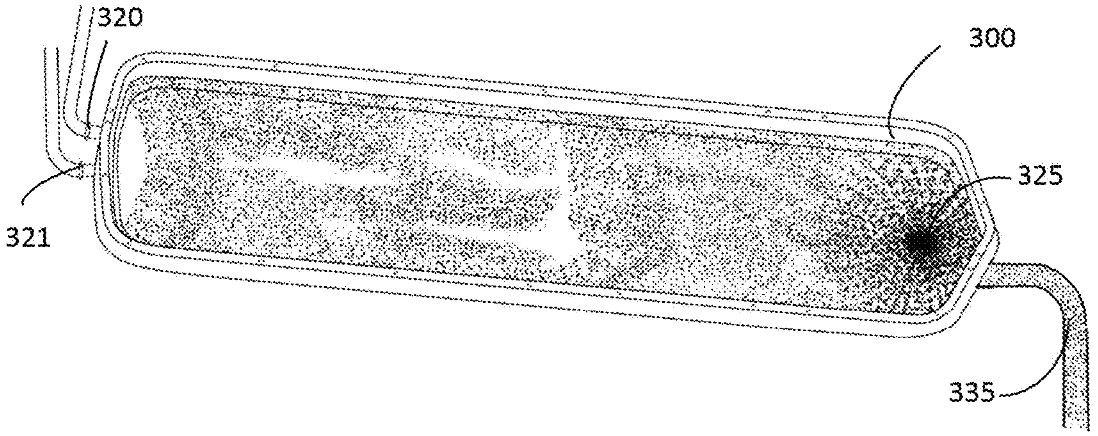
FIG. 6 is a diagram of a tray with biomass moving and draining from the tray, from a perspective view, according to some embodiments.

FIG. 1 is a diagram of an exemplary tray 300 for growing biomass, from a perspective view, according to some embodiments. As depicted, the tray 300 comprises at least one inlet, such as orifice 310 or 311, which may be on the side of the tray 300, or someplace else such as at the bottom of the tray, and at least one drain, such as orifice 325. In some embodiments, the drain such as orifice 325 is placed at the bottom of the tray 300. In some embodiments, the drain is placed at the side of the tray 300. In some embodiments the orifices have connected conduits, such as conduits 320, 321, for attaching tubes or other conduits, such as depicted in FIG. 4 for example. In some embodiments, the drain has a connected conduit and/or tube for streaming the drained fluid and biomass to another container, such as depicted in FIG. 6 for example. The inlet orifices, such as orifices 310, 311, are used for flowing fluids and/or for transferring biomass over fluids into the tray 300. The tray 300 may be flooded with a medium fluid, comprising mineral water, for example, acting as a substrate for growing the biomass. The growing substrate fluid may be for nourishing the biomass and providing a desirable environment for the biomass to multiply and grow. An initial amount of biomass may be added into the substrate fluid, sometimes referred to as seeding, where the biomass can float, reproduce and grow to form large "carpets" of floating biomass over the medium in the tray 300, such as depicted in FIG. 3 for example. The biomass, or part of the biomass, may then be gathered and drained to a different container.

Figure 2:
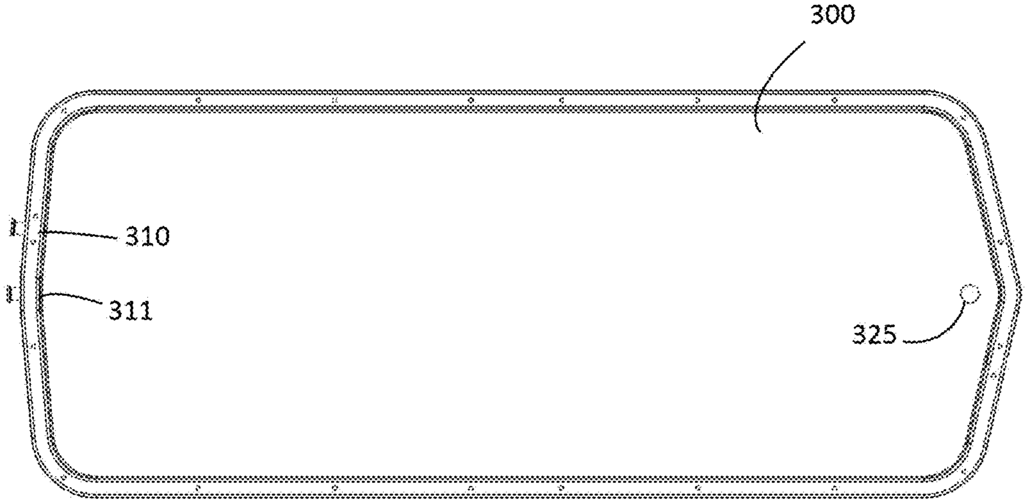
FIG. 2 is a diagram of the exemplary tray for growing biomass, from a top view, according to some embodiments.

FIG. 2 is a diagram of the exemplary tray 300 for growing biomass, from a top view, according to some embodiments. In some embodiments, the tray 300, described in relation to FIG. 1, has two inlet orifices 310, 311 for flowing fluids and/or biomass into the tray 300, and an orifice 325 for draining fluids and/or the biomass from the tray 300. The orifice 325 may also be used for leveling the height of the fluid inside the tray 300, e.g. by draining out some of the fluid, with the height measured in the direction of gravity.

FIG. 3 is a diagram of biomass floating over fluids in the tray 300, from a perspective view, according to some embodiments. The tray 300, as described in relation to FIG. 1, has orifices with connected conduits, such as conduits 320, 321. In some embodiments, the conduits 320 and/or 321 may be attached to tubes, for flowing fluids and biomass into the tray 300. In some embodiments, each of the orifices may have a closing mechanism for controlling the flow through the orifice. In some embodiments, each of the conduits 320, 321 that is attached to the orifices may have a valve, such as valves 340 and/or 345 depicted for example in FIG. 4, for controlling the flow through the orifice. In some embodiments, the conduit 320 or 321 itself may be used for controlling flow through the orifice, e.g. by lifting or lowering part of the conduit 320 or 321 in relation to the fluid level within the tray 300 in the direction of gravity, and allowing the gravitational force to stop or commence the flow. At first, a medium fluid together with biomass plants may be flowed into the tray 300, e.g. through conduits 320 and 321. Then, the biomass plants may be left to multiply and grow while floating over the fluid in the tray 300, until the biomass plants are ready for gathering and draining. In some embodiments, the desired time for gathering and draining the biomass plants is when the biomass plants are carpeted in one to three layers at the surface of the fluid.

FIG. 4 is a diagram of a tray 300 with biomass 328 floating and draining from the tray 300, from a perspective view, according to some embodiments. In order to gather the biomass from within the tray 300 and drain the biomass 328 to another place, such as another container, the valve 345 is opened, the fluid inside the tray 300 is drained through the orifice 325 into conduit 335, and the fluid level is gradually decreased to a specific height from the bottom of the tray 300 to the fluid surface, where a "surface fall" operation is triggered, which will be described below in relation to FIG. 5. This specific height, where the surface fall operation is triggered and where the floating biomass 328 is gathered and drained efficiently through the orifice 325 based on the laminar flow phenomena, is referred to hereinafter as the "surface flow height". In some embodiments, the fluid level inside the tray 300 is first drained and decreased to the surface flow height which is about 3 mm from the bottom of the tray. In some embodiments, the surface flow height is about 1 mm from the bottom of the tray 300. In some embodiments, the surface flow height is in a range of 1 mm to 3 mm from the bottom of the tray 300. In some embodiments, the surface flow height may be in a range of 2 mm to 6 mm from the bottom of the tray 300. In some embodiments, the surface flow height may be in a range of 4 mm to 6 mm from the bottom of the tray 300. In some embodiments, the conduit 320 and/or 321 is attached to a pump for pumping and flowing fluid and/or floating biomass 328 into the tray 300 through at least one inlet orifice. In some embodiments, the conduit 335 is attached to a pump for pumping and draining the fluid and/or floating biomass 328 through orifice 325. In some embodiments, the fluid and/or floating biomass 328 are drained through orifice 325 by gravity. In some embodiments, drainage of the fluid and/or floating biomass 328 through orifice 325 is controlled by lifting or lowering part of the conduit 335 in relation to the fluid level within the tray 300 in the direction of gravity and allowing the gravitational force to stop or commence the flow.

Figure 5:
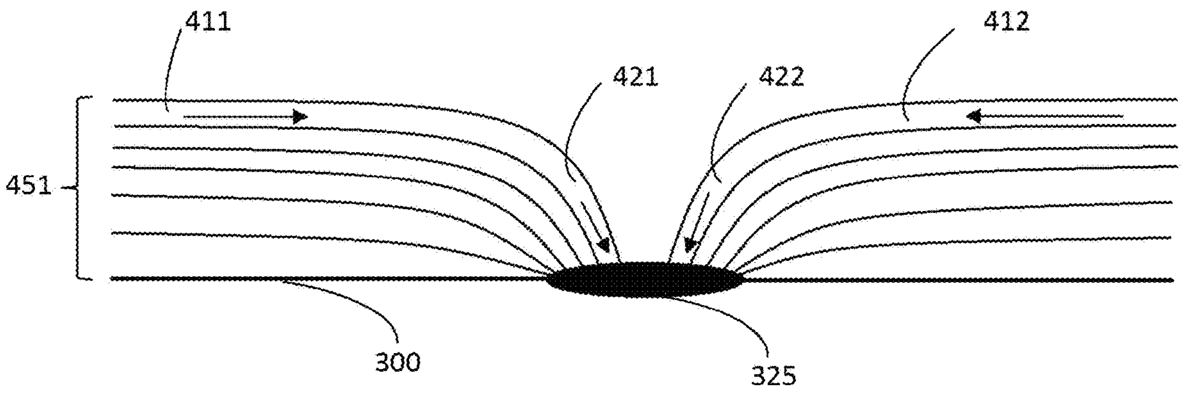
FIG. 5 is a schematic diagram representing a laminar flow cascade drainage of fluids within a tray, from a side view, according to some embodiments.

FIG. 5 is a schematic diagram representing a laminar flow cascade drainage of fluids within a tray 300, from a side view, according to some embodiments. As depicted, when the fluid level within the tray 300 is decreased to the surface flow height 451, where the surface layer of the fluid 411, 412 containing the floating biomass floats in the highest speed and can be drained in a surface fall operation, the surface layer 411, 412, in the fluid falls in a cascading manner 421, 422, respectively, into the drain orifice 325, enabling efficient gathering and draining of the floating biomass. In some embodiments, the cascading fall of the floating biomass into the orifice 325 is conducted in a freefall form, similar to a small waterfall. In some embodiments, the cascading fall of the floating biomass into the orifice 325 is conducted in a turbulent form, e.g. similar to a vortex form in a drainage system, or in any other possible fall formats.

FIG. 6 is a diagram of a tray 300 with biomass moving and draining from the tray 300, from a perspective view, according some embodiments. After the fluid level inside the tray 300 is decreased to the surface flow height where the surface fall operation is triggered and the surface fluid layer with the floating biomass starts falling in a cascading manner into the orifice 325, then fluid is flowed into the tray 300 from inlet conduit 320 and/or 321 in order to maintain the surface flow height of the fluid level in the tray 300, for maintaining the surface fall operation. In order to maintain the surface flow height of the fluid level in the tray 300, the volume flow rate of the fluid flowed into the tray 300 is controlled to match the volume flow rate of the drained fluid and the drained biomass out from the tray 300 through the drain orifice 325. The fluid flow into the tray 300 may continue in a steady and consistent flow until a preset percentage of residue of the biomass is left in the tray. In some embodiments, the volume flow rate of the fluid flowed into the tray 300 is maintained until a minimal residue of less than 0.01% of the collected biomass within the tray 300 is left in the tray 300. In some embodiments, the volume flow rate of the fluid flowed into the tray 300 is maintained until a minimal residue of less than 30% of the collected biomass within the tray 300 is left in the tray 300. In some embodiments, the volume flow rate of the fluid flowed into the tray 300 is maintained until a residue of a range of 0.01% to 30% of the collected biomass within the tray 300 is left in the tray 300. In some embodiments, the volume flow rate of the fluid flowed into the tray 300 is maintained until the initial quantity, e.g. the seeding quantity, of biomass within the tray 300 is left in the tray 300. In some embodiments, the tray 300 comprises two inlet orifices for flowing fluids into the tray 300 from the two inlet orifices, for actively improving the floating biomass gathering towards the drain orifice 325. In some embodiments, the two inlet orifices splash fluids in a number of angles into the tray 300 for actively gathering biomass from the inner sides of the tray towards the drain orifice 325. In some embodiments, at least one of the inlet orifices and at least one of the drain orifices are located at opposite sides of the tray. In some embodiments, a conduit or a tube, such as conduit 335, is attached to the outlet of the drain orifice 325 in order to guide the stream of the drained biomass and fluid. In some embodiments, the orifices have different sizes and different shapes such as: oval, conus, etc.

In some embodiments, the flowing of fluids into the container and the draining of the biomass and the fluids out of the container is controlled by an electric controller which controls the closing mechanisms, or the valves, for controlling the flow through the orifices. In some embodiments, the controller also controls the pump that is attached to the drainage conduit, for controlling the flow through the drain orifice and for an automated operation.

In some embodiments, the flowing of fluids into the container and the draining of the biomass and the fluids out of the container can be used for operation under sterile conditions, using sealed trays and tubes, for preventing microorganisms from entering the system and affecting the biomass.

In some embodiments, there is at least one measurement action to measure and match the volume flow rate of the fluid into the tray, through at least one of the inlet orifices, with the draining volume flow rate, through at least one drain orifice, for maintaining the surface flow height of the fluid level in said tray, for maintaining the surface fall operation, where the surface fluid layer and said floating biomass fall in a cascading manner. In some embodiments, at least one measurement actions may be attached to at least one of the inlet orifices and/or attached to at least one of the drain orifices and/or attached to at least one of the conduits which is attached to at least one of the orifices. In some embodiments, the draining volume flow rate may be measured by attaching a measurement container to the drain and timing the filling of the container. In some embodiments, once the draining volume flow rate is measured and known for a certain tray design, said draining volume flow rate may be assumed when operating each tray of the same design. As a non-limiting example of maintaining a surface fall operation, if the tray is drained at a flow rate of about 2.5 liters for 30 seconds, then 2.5 liters are flowed into the tray for about 30 seconds to maintain the surface flow height of the fluid level in the tray. In some embodiments, a flow sensor, such as ultrasonic flow meter SUH201 from ifm electronic, may be attached to the drain conduit for sensing the velocity of the fluid flowing through the conduit and measuring the draining volume flow rate. In some embodiments, a flow sensor may be attached to the inlet conduit for sensing the velocity of the fluid flowing into the conduit for matching the volume flow rate of the fluid into the tray with the draining volume flow rate. In some embodiments, the fluid volume flow rate into the conduit may be less than the draining volume flow rate and may be timed so as to effectively drain the floating biomass in a cascading manner and empty the tray at the same time. In some embodiments, a height sensor may be implemented in the tray and each time the fluid level within the tray drops under a certain level, fluids may be streamed into the tray to maintain the surface flow height of the fluid level in the tray for maintaining the surface fall operation. In some embodiments, the drainage velocity may be mathematically calculated based on the known gravity coefficient and the drain size.

While the above description discloses many embodiments and specifications of the invention(s), these were described by way of illustration and should not be construed as limitations on the scope of the invention(s). The described invention(s) may be carried into practice with many modifications which are within the scope of the appended claims.

What is claimed is:

1. A method for gathering and draining floating biomass, the method comprising:

providing a tray for holding said floating biomass and a fluid, wherein said tray comprises at least one inlet orifice and at least one drain orifice and wherein said at least one drain orifice is placed at a bottom of said tray;

draining through said at least one drain orifice and gradually decreasing a surface layer containing said floating biomass within said tray to a surface flow height such that a surface fall operation is triggered;

draining a part of said surface layer of said fluid and at least a part of said floating biomass through said at least one drain orifice wherein said surface layer containing said floating biomass is moving in a laminar flow fashion towards said at least one drain orifice at the bottom of said tray and wherein said part of said surface layer and said at least a part of said floating biomass are drained in said surface fall operation; and flowing fluid into said tray through said at least one inlet orifice of said tray to continue said draining of said part of said surface layer of said fluid and said at least a part of said floating biomass through said at least one drain orifice to maintain said surface fall operation in said tray.

2. The method according to claim 1, further comprising:

continuing to flow said fluid through said at least one inlet orifice, to maintain a surface flow height of a fluid level in said tray; and controlling a volume flow rate of said fluid flowed into said tray to match a volume flow rate of said fluid and said floating biomass drained from said tray through said at least one drain orifice.

3. The method according to claim 1, wherein said floating biomass is gathered and drained until a preset portion of said floating biomass within said tray is left in said tray.

4. The method according to claim 3, wherein said preset portion is greater than 0% and less than or equal to 0.01% of said floating biomass collected.

5. The method according to claim 1, wherein said floating biomass is a floating aquatic plant culture.

6. The method according to claim 1, further comprising at least one measurement action to match a volume flow rate of said fluid into said tray through said at least one inlet orifice of said tray with a draining volume flow rate through said at least one drain orifice of said tray, to maintain said surface flow height of a fluid level in said tray and said surface fall operation, wherein said surface layer and said floating biomass are drained in said surface fall operation.

7. A system for gathering and draining floating biomass comprising:

a tray for holding said floating biomass and a fluid comprising:

at least one drain orifice placed at the bottom of said tray and configured to drain at least a part of said floating biomass and at least a part of a surface layer of said fluid; and at least one inlet orifice configured to flow fluid into said tray to maintain a surface flow height, to maintain a surface fall operation of a fluid level in said tray while continuing to drain said at least part of said floating biomass and said at least a part of said surface layer of said fluid wherein said surface layer containing said floating biomass is moving in a laminar flow fashion towards said drain orifice at the bottom of said tray wherein said surface layer and said floating biomass are drained through said at least one drain orifice in said surface fall operation.

8. The system according to claim 7, further comprising a pump connected to said at least one inlet orifice for flowing fluid into said tray.

9. The system according to claim 8, further comprising a controller configured to control said pump connected to said at least one inlet orifice for controlling a flow of fluid into said tray.

10. The system according to claim 7, further comprising a pump connected to said at least one drain orifice for draining said at least said part of said floating biomass and said at least said part of said surface layer of said fluid.

11. The system according to claim 10, further comprising a controller configured to control said pump connected to said at least one drain orifice for controlling a flow of fluid from said tray.

12. The system according to claim 7, wherein said at least one drain orifice and said at least one inlet orifice each comprise a closing mechanism to control a flow through said at least one drain orifice and said at least one inlet orifice.

13. The system according to claim 7, wherein said at least one drain orifice and said at least one inlet orifice each comprise at least one connected conduit.

14. The system according to claim 13, wherein said at least one connected conduit comprises at least one valve to control a flow through said at least one drain orifice and said at least one inlet orifice.

15. The system according to claim 14, further comprising a controller configured to control said at least one valve on said at least one connected conduit to control said flow of said fluid into said tray.

* * * * *